US008850464B2

(12) United States Patent
Aldrey et al.

(10) Patent No.: US 8,850,464 B2
(45) Date of Patent: Sep. 30, 2014

(54) SYSTEMS AND METHODS FOR REAL-TIME INTERACTIVE TELEVISION POLLING

(75) Inventors: Raul Aldrey, Brookline, MA (US); Edwin Elberg, Woburn, MA (US); Luis Blando, Wobum, MA (US); Diego Crespo, Boston, MA (US); Anil Guntupalli, Waltham, MA (US); Enrique Ruiz-Velasco, Flower Mound, TX (US); Shafiq Kassam, Lewisville, TX (US); Maitreyi Krishnaswamy, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1108 days.

(21) Appl. No.: 11/539,739

(22) Filed: Oct. 9, 2006

(65) Prior Publication Data

US 2008/0086742 A1   Apr. 10, 2008

(51) Int. Cl.
| | |
|---|---|
| *H04N 7/14* | (2006.01) |
| *H04N 7/173* | (2011.01) |
| *H04H 60/33* | (2008.01) |
| *H04N 21/475* | (2011.01) |
| *H04N 21/25* | (2011.01) |
| *H04N 21/466* | (2011.01) |
| *H04H 60/93* | (2008.01) |

(52) U.S. Cl.
CPC ........... *H04H 60/33* (2013.01); *H04H 2201/30* (2013.01); *H04H 60/93* (2013.01); *H04N 21/4756* (2013.01); *H04N 21/252* (2013.01); *H04N 21/4667* (2013.01); *H04N 21/4758* (2013.01)
USPC .................................. 725/14; 725/13; 725/16

(58) Field of Classification Search
CPC .......... H04N 21/8173; H04N 21/4758; H04N 5/44591
USPC ............. 725/9, 13, 14, 16, 24, 1, 2, 4, 20, 34, 725/35, 105, 109, 112, 114
See application file for complete search history.

(56) References Cited

U.S. PATENT DOCUMENTS

| | | | | |
|---|---|---|---|---|
| 6,081,830 | A * | 6/2000 | Schindler ...................... | 709/204 |
| 6,505,160 | B1 * | 1/2003 | Levy et al. ..................... | 704/270 |
| 7,251,495 | B2 * | 7/2007 | Keyani et al. ................. | 455/466 |
| 7,305,693 | B2 * | 12/2007 | Blackketter et al. ............ | 725/61 |
| 2002/0124247 | A1 * | 9/2002 | Houghton ......................... | 725/9 |
| 2003/0100321 | A1 * | 5/2003 | Rao et al. ....................... | 455/466 |
| 2003/0172374 | A1 * | 9/2003 | Vinson et al. ..................... | 725/9 |
| 2004/0133907 | A1 * | 7/2004 | Rodriguez et al. .............. | 725/14 |
| 2005/0267994 | A1 * | 12/2005 | Wong et al. ................... | 709/246 |
| 2007/0250848 | A1 * | 10/2007 | Gorti et al. ...................... | 725/14 |
| 2008/0061142 | A1 * | 3/2008 | Howcroft et al. ............. | 235/386 |

\* cited by examiner

*Primary Examiner* — Benjamin R Bruckart
*Assistant Examiner* — Jason Thomas (57) ABSTRACT

Systems and methods are disclosed for providing polling related data to viewers in an interactive cable televisions system. Users viewing a program can initiate a request for participating in a polling activity. The request and other program-related information are sent to the cable television system provider. Appropriate polling window data is returned to the set top box allowing a polling window to be displayed to the viewer. The viewer may choose one or several selections, and transmit the response to the cable television system provider. User responses can be tallied and presented in real time to the viewer audience. Program producers can incorporate the results of viewer feedback in real-time allowing the outcome of the program to be based on the collective viewer feedback.

20 Claims, 7 Drawing Sheets

SYSTEMS AND METHODS FOR REAL-TIME INTERACTIVE TELEVISION POLLING

BACKGROUND INFORMATION

Television viewing has traditionally been a passive experience, with viewers watching a program and able to provide only limited feedback. Producers of television programs have used various methods in an attempt to provide a semi-interactive viewing experience. It is presumed that 'interactive viewing' creates a greater public interest in the program and contributes to creating a larger viewing base. Methods for involving viewers include coordinating external contests and promotions, however, these are not real time. Because of difficulties in obtaining widescale real-time viewer feedback, some programs incorporate a studio audience as part of the program where the audience has the ability to provide real time feedback via handheld devices. The real time feedback is often used to select a favorite contestant (e.g., for contest-themed programs evaluating a particular contestant or performer).

While such technology can be readily implemented in a studio via wireless devices or voting consoles on each seat in a studio audience, obtaining feedback from television viewers in real-time is difficult. Past mechanisms for soliciting real time viewer feedback have included announcing a toll free telephone number on the program which callers could call and interact with an automated system. Such systems allow viewers to provide their feedback in terms of selections, votes, or opinions regarding a specific program. However, such telephone numbers were dedicated for providing feedback for a certain program and are usually limited in duration. Obviously, viewers without a telephone or unwilling to dial the telephone number were precluded from providing feedback.

Similar mechanisms for soliciting viewer feedback have been defined using other technologies. One such technology is based on text messaging—specifically "short message service" or SMS—which often uses a cell phone for message origination. Some television shows have displayed a "shortcode", which is an SMS destination address, for directing viewers' real-time feedback. Similar to using different telephone numbers for telephone-based view feedback, separate shortcodes are simultaneously employed to collect input for different viewer's votes or opinions.

The technology of two-way cable networks provides the opportunity for enhanced viewer feedback without requiring viewers to access a telephone. Two-way cable technology provides the possibility of television producers and cable operators to provide a more interactive viewing experience. However, to date, few useful and effective applications for user interaction have been defined and the technology used in two-way cable networks has not been adapted very well for receiving viewer feedback. Therefore, systems and methods for real-time interactive viewer feedback are required for programming on a cable network.

DETAILED DESCRIPTION OF PREFERRED EMBODIMENTS

The preferred embodiments implemented according to the present inventions now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Many popular television programs incorporate audience feedback as part of the structure of the program, often by relying on studio audience participation. Other programs advertise a telephone number for the general viewing audience to vote or otherwise provide their feedback. The development of two-way cable networks allows enhanced capabilities for defining interactive program formats and provides a convenient means for audience members outside the studio to interact with the program, in many cases while the program is airing. Further, use of two-way cable networks allows collection and dissemination of viewer feedback on a real-time basis.

User feedback can be provided in various forms and is known by different terms, such as voting or polling. Both terms describer a viewer providing feedback for selecting one of, or a subset of, a defined set of choices. As used herein, 'polling' is to be broadly construed and does not differentiate between the meaning of the user's feedback. One potential application for polling is for a television program director to employ the results of real-time viewer polling to select a favorite contestant or performer. This is quite common on popular shows that rate a plurality of participants' performance abilities, e.g., where the audience selects a favorite singer. In such cases, real-time analysis of the polling is required to effect the outcome of the program.

Figure 1:
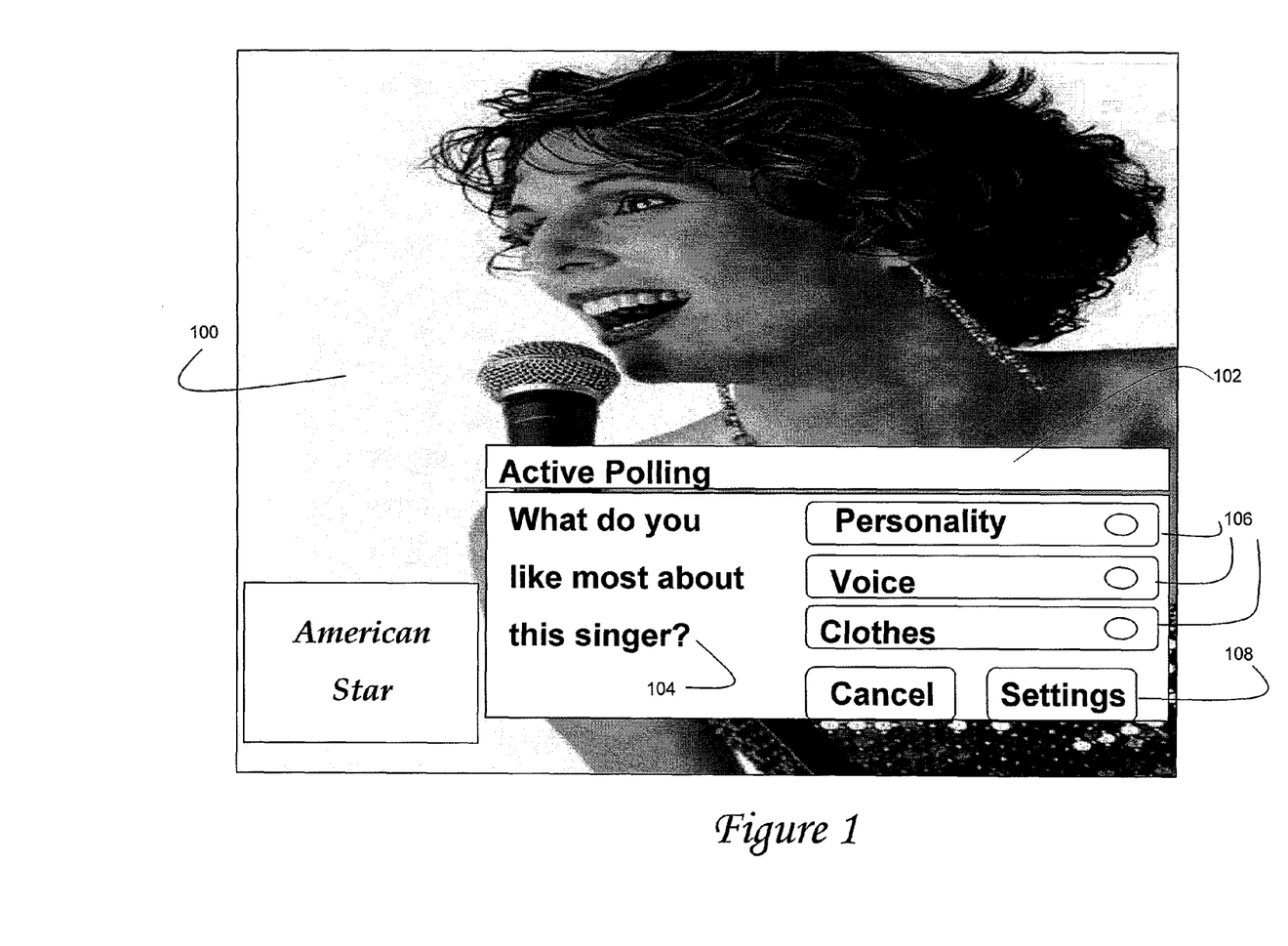
FIG. 1 illustrates one embodiment of a polling window presented to a viewer for receiving viewer feedback pertaining to a presently viewed program.

An embodiment of the user interface for providing user feedback is shown in FIG. 1. These are typically embodied as a web page presented in a window displayed on the display device (e.g., a television, computer display, monitor, etc.).

The contents, format, and options of the polling window can vary, based on the particular application, and is collectively referred to as "polling window data." In FIG. 1, the video program currently viewed is being displayed on a television as the background image 100. Based on certain triggering events (discussed below), a polling window 102 is overlayed on the video image 100. Although FIG. 1 shows the video image 100 as a (static) image, in most cases, it is real-time motion video. Typically, the video information occupies the larger portion of the display screen and is displayed in the background. The polling window typically poses one or more questions 104 along with a series of options 106 for user (a.k.a. viewer) input. These questions are typically correlated with the program so that they pertain to the program material displayed on the background video. Thus, the polling window data is often associated with the video. For example, questions may solicit viewer input regarding the performer currently being viewed. In some embodiments, the options that the viewer may select are exclusive (e.g. the viewer can only select one ), while in other embodiments, the options may be independently selected (e.g., selecting one option does not preclude selecting another). In the embodiment shown in FIG. 1, three options 106 are illustrated, and the user can select or respond to each option independently using their remote controller. When finished, the user selects an input button 108 for submitting their response or altering their input.

In this embodiment, the feedback information is collected and provided to the program director and may be used to influence the outcome of the program. Specifically, if viewers select a favorite performer, the program director may announce the results and declare that performer the winner of the contest. Thus, the feedback results can be used to influence the outcome of the program. The determination may be in real-time (e.g., as the program is occurring), or non-real time (e.g., impacting the contents of the next episode of the program). Other options include evaluating viewer feedback during a scheduled commercial break during a program (in which the winner is announced after the commercial break). Other embodiments may select certain contestants (e.g., the non-eliminated contestants) for the production of the next episode.

Figure 2:
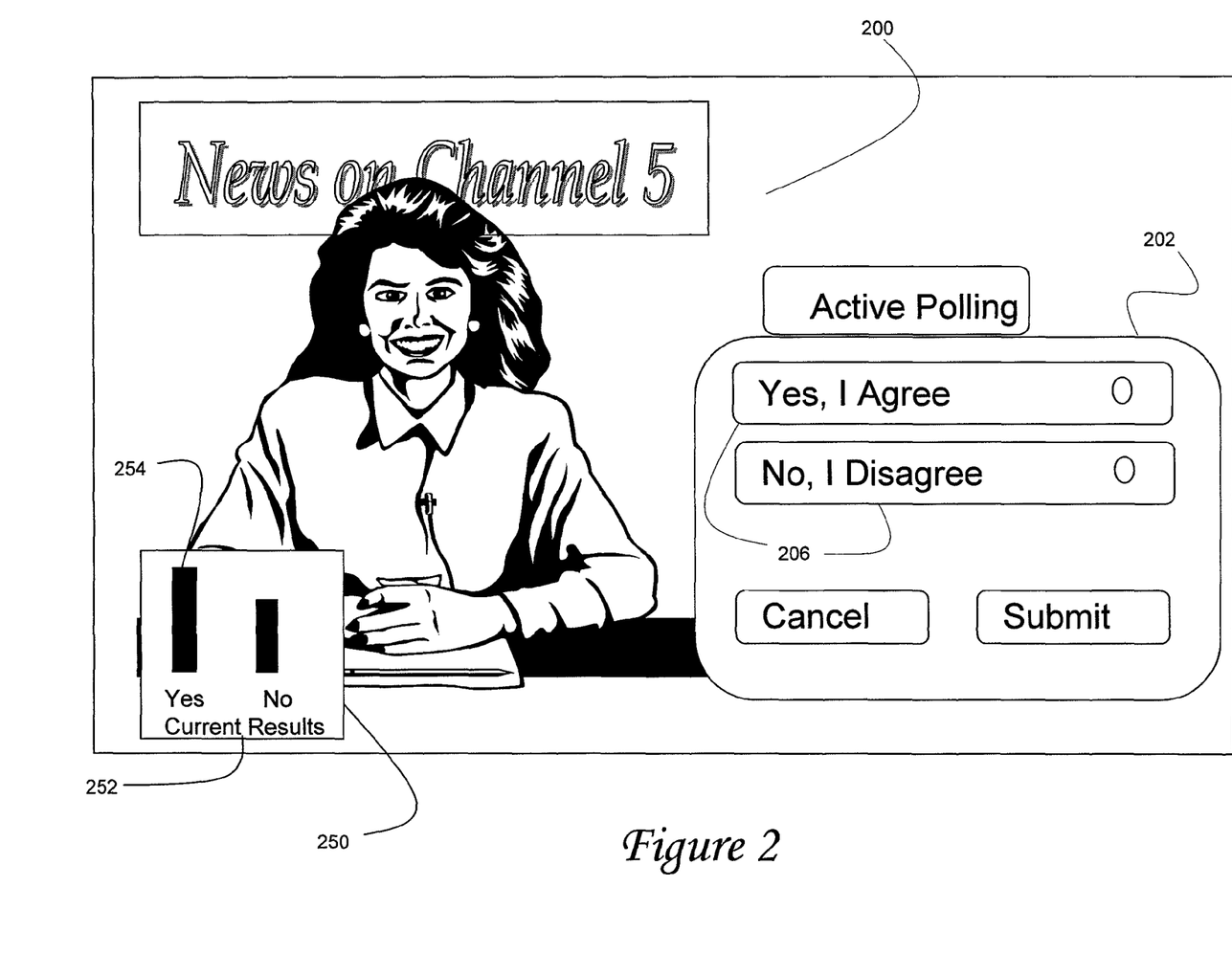
FIG. 2 illustrates another embodiment of a polling window presented to a viewer for receiving viewer opinions.

Another potential application is soliciting a viewer's opinion regarding an event or receiving a viewer's response to an announcer's commentary. For example, in sports-related programs, a referee may make a judgment call and the audience is provided with the opportunity to agree, disagree, or select an option indicating their opinion of how the event should be judged. Consistent with this application, another embodiment of the user interface is shown in FIG. 2. In FIG. 2, a polling window 202 is again overlayed over the video program 200 when displayed on the television and presents the viewer with two options 206. In this case, the options are exclusive and the viewer can select only one of the two options.

In this embodiment, the feedback is not used to after the outcome of the program, but the results of the poll can be presented to the user for informational purposes. In FIG. 2, a real time indication may be provided, via a separate window 250 showing the relative indications of the viewer's feedback as they occur. The information may incorporate a legend 252 along with a graph 254 or other icons for showing the real time results. Additionally, total number of poll results or percentages may be presented (not shown). Alternatively, the total results can be computed and presented as a final result. The results may also provide a summary of the relative percentages.

This results information can be processed and presented several ways. In the first way, the program producer accesses the viewer feedback data from a computer system analyzing the results and uses the feedback results to create the window 250 as part of the video signal feed. Thus, when the viewer input is received by a program producer in real-time, the program producer may integrate the data into the program video signal. Alternatively, the information may be processed by the cable or program provider and overlayed on the video signal feed. In either case, the user receives the video signal with the results integrated as part of the video. In this case, the only difference is where along the distribution path the results are integrated with the video signals.

In other embodiments, results information may be provided in a separate IP or video channel to the set top box. Alternative embodiments may send the viewer feedback result data to the set top box allowing the set top box to overlay the results or present it using a separate polling window. This would allow, for example, local control (e.g., a user selecting an option on a set top box) as to whether such results are presented on the screen. Each of the above methods may produce end results which appear the same to the viewer, but are constructed by different procedures.

Although FIGS. 2 shows the result information as a separate box overlaying a portion of the video, other alternatives exist, including using a 'banner' on the bottom of the page. In this embodiment, the video image aspect ratio of the regular program is altered so that none of the video is hidden by the presentation of the viewer polling results in a lower segment of the display. The real-time polling results information can be continuously displayed in a banner, incorporating either a static display of information (which can be updated in real-time), or a moving display of information (which also can be updated in real time). Such alternatives are well known in the art, and are within the scope of the present invention.

User feedback can also be provided in the form of rating-related information ('ratings'), which are collected by the programmer or cable provider and used to influence program selection of other viewers. Recommendations or ratings may be provided to a viewer by the cable provider by recommending programs in a certain order, providing program review or rating services to viewers, or combinations thereof. For example, after viewing a program, a viewer may provide feedback on various aspects of the program. This information is collected by the network, and compiled into a real-time rating indication for subsequent viewers. A user may opt to view a program's rating level prior to selection of the program, or in conjunction with viewing program guide information. In such embodiments, it may be desirable to expand the size of the window providing results information to the viewer so as to make the information more readable and minimize the distraction provided by the program images in the background.

Figure 3:
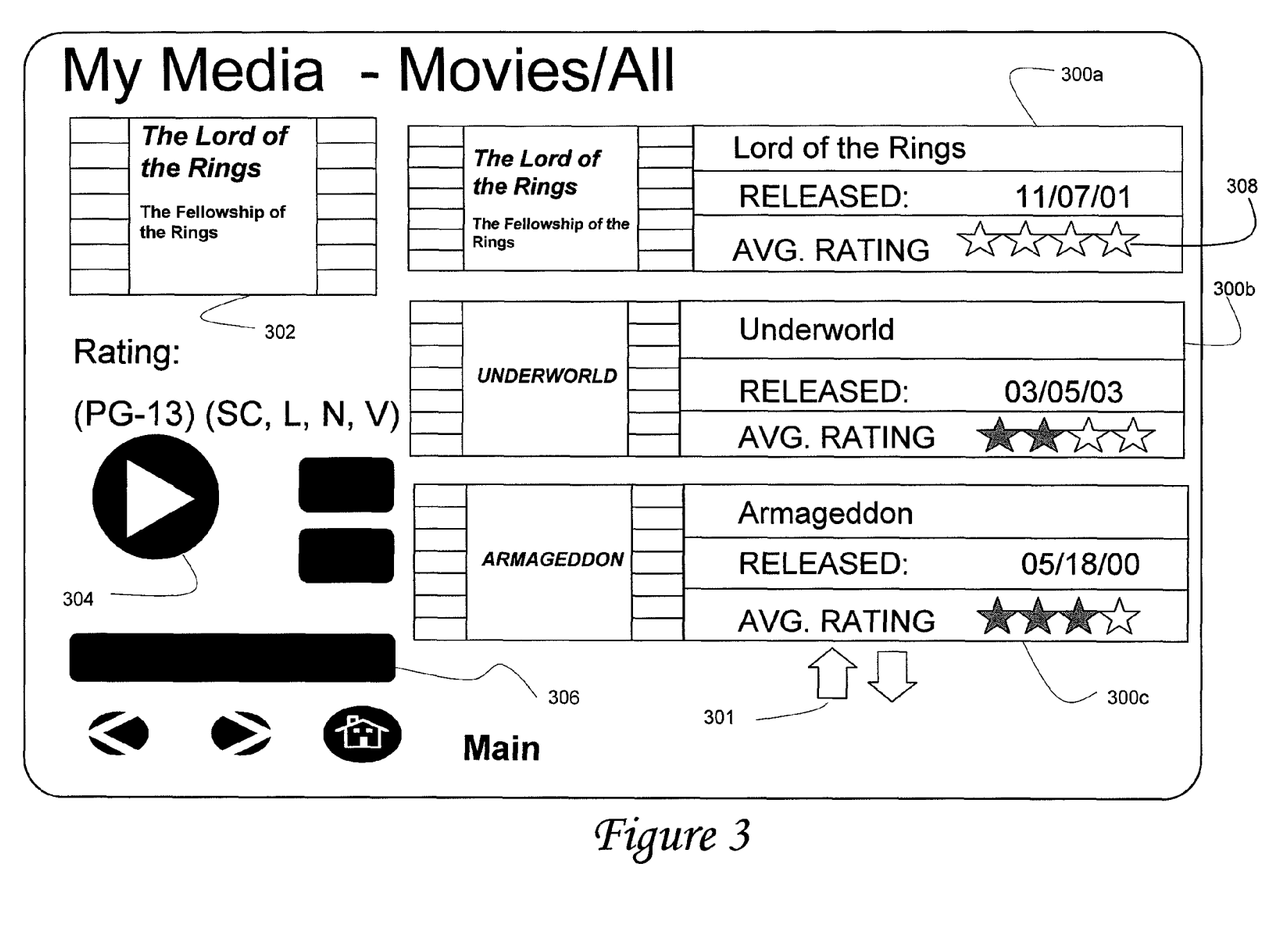
FIG. 3 illustrates one embodiment of a polling window presented to a viewer for presenting rating information regarding a yet to be selected program

Another embodiment of the user interface for providing and viewing feedback is shown in FIG. 3. In FIG. 3, a series of options in the form of movie titles 300a-c are shown. The rating window shows the current selection 302 and a rating indicator 308 indicates the cumulative audience feedback for this program. The rating indicator is typically an icon (e.g., star, thumbs-up symbol, etc.). Often, the icon is repeated (e.g., three times, for a rating of "three-out-of-five"). The user may also select to view the movie by selecting an icon 304 or view comments by others of the movie 306 by selecting another icon. The detailed comments could incorporate professional movie critiques, details of the actors/actresses appearing in the movie, audience feedback, or some other form.

Figure 4:
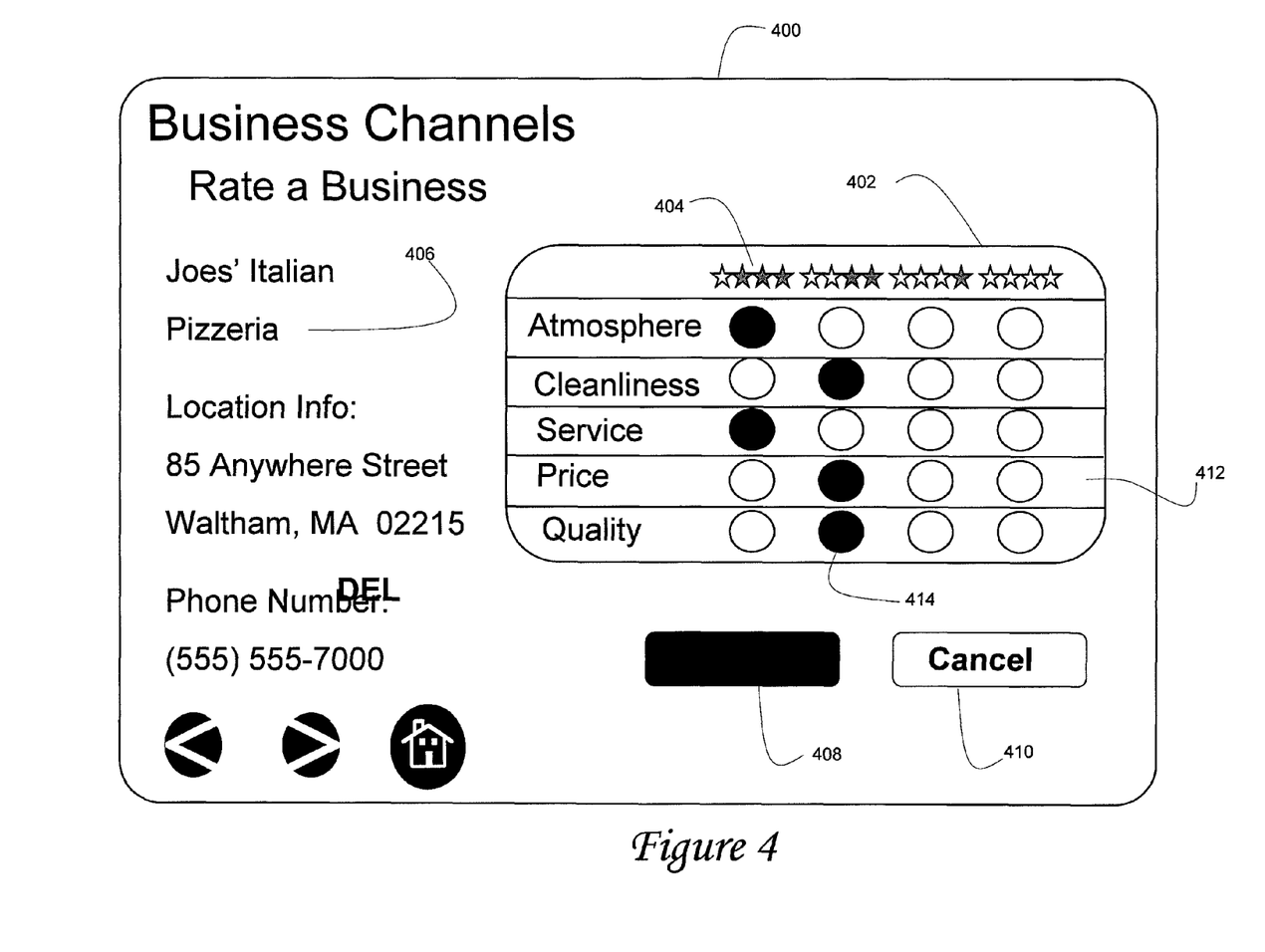
FIG. 4 illustrates one embodiment of a polling window presented to a viewer for presenting rating information regarding a local business entity.

In another application of a viewer providing rating information, users may be able to view and rate a local business enterprise, for which one embodiment is shown in FIG. 4. The polling window 400 shows the business' name 406 along with location information. A separate portion 402 displays various criteria, such as "price" of the goods or services 412, along with the cumulative average rating 404. Users can input their values using appropriate icons 414. Users can then select the 'send' icon 408 to send their input for processing, or select a 'cancel' icon 410 to exit.

In another application of real time polling, viewers are presented the opportunity to provide feedback wherein the viewers may be limited to a group having certain characteristics. In one embodiment, the cable network provider may correlate certain demographic characteristics with certain customers. These are, in turn, matched to corresponding set top box addresses. This would allow surveys or polls to be directed to certain select demographic groups.

Another embodiment involves the creation of certain defined groups, referenced herein as "common interest groups" (CIG). Each CIG can be administered by a group leader and all members are eligible to receive poll requests. The criteria for inclusion of a common interest group may be defined as membership of a club, organization, community, or other group that is to receive real time polling opportunities. The common interest group could be based on local sports team fan club, a user defined list (e.g., private club), viewers in a geographical area (e.g., city residents), or other criteria. The size of the group can vary, from local, regional, or national.

Figure 5:
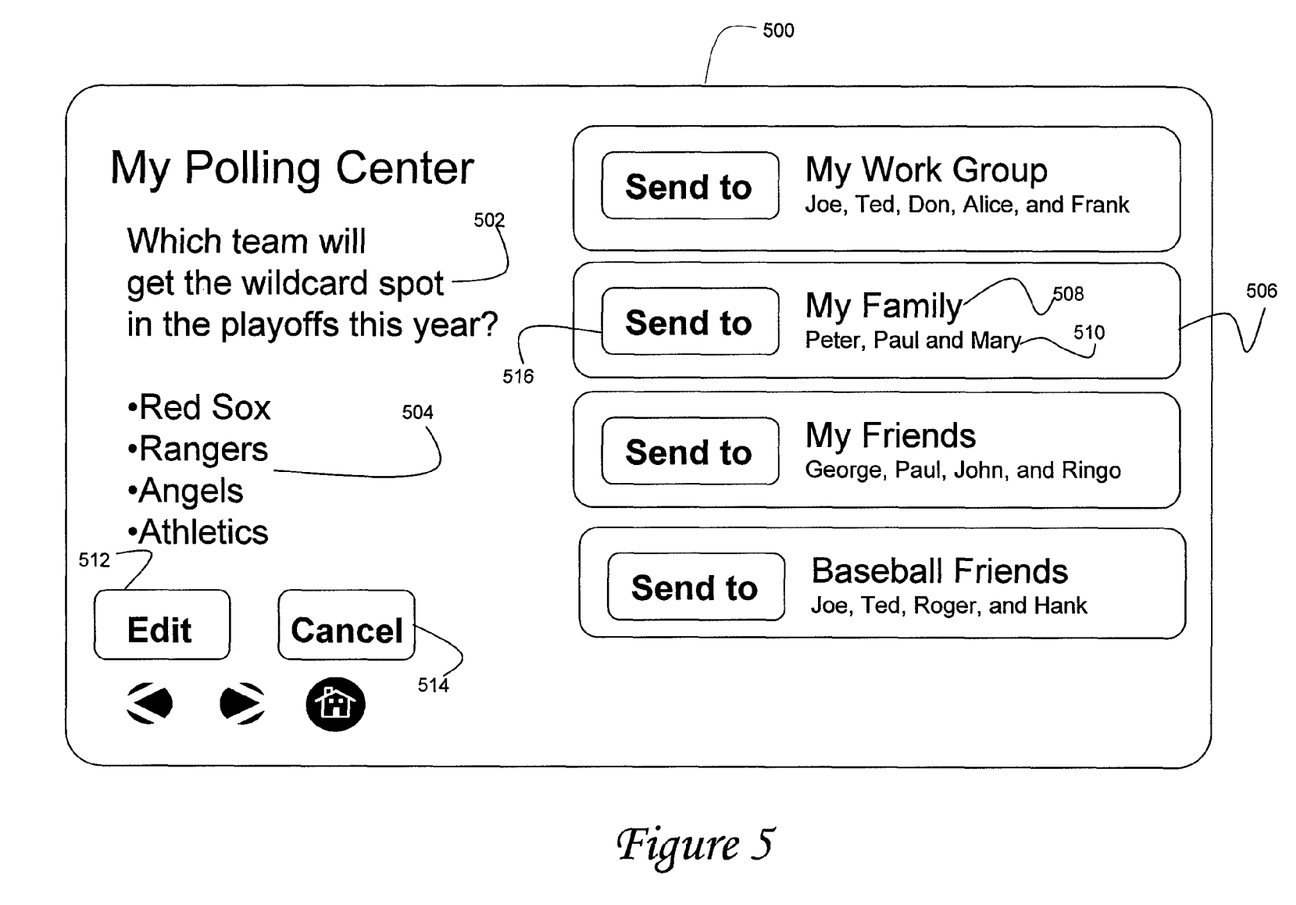
FIG. 5 illustrates one embodiment of a polling window presented to a viewer for polling select user-defined groups.

FIG. 5 illustrates a polling window 500 in which a viewer can define a question 502 for presentation to various user groups. In FIG. 5, the user has created the question 500, and a list of potential answers 504 to select from. There are defined separate interest groups, such as their family 502, for receiving the question. Each CIG group typically has a name 508 and a list of members 510. Once the selections are completed, the user can submit the request for processing by selecting the appropriate icons 516. Once polling is completed, the user may be able to view the results, as well as authorize release of the poll results to the group. In addition, other icons such as edit 512 and cancel 514 allow the user to make changes or exit.

Figure 6:
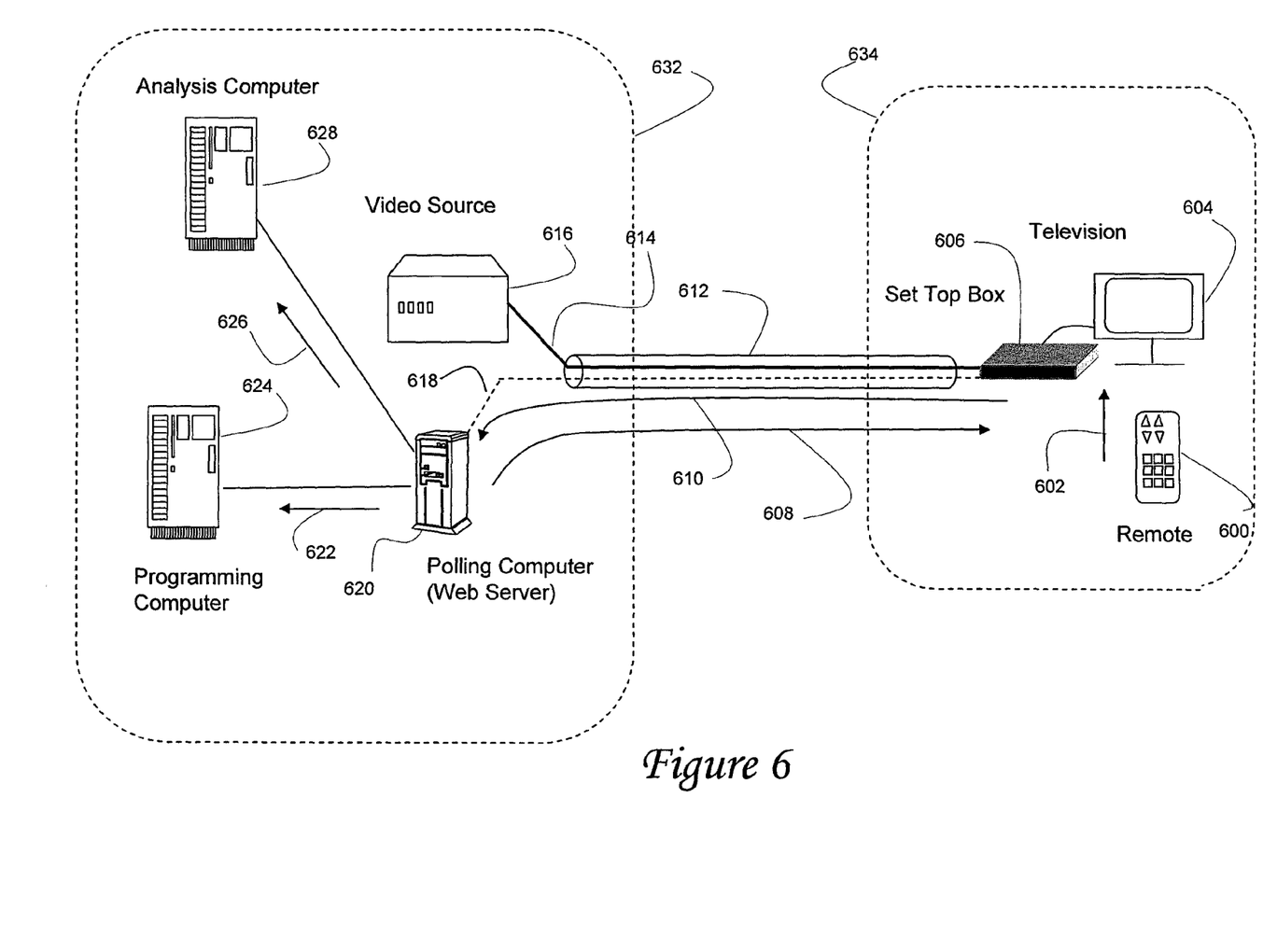
FIG. 6 illustrates one embodiment of a network architecture for realizing real-time viewer polling.

A preferred network architecture associated with real time polling is shown in FIG. 6. In FIG. 6, a user or subscriber premises 634 comprises a set top box 606, a television 604, and a wireless remote controller 600. The remote controller 600 is used to allow viewers to communicate with the set top box (including provide polling input in response to polling). The set top box 606 is connected to a two-way, video enabled network 612 (for example, a hybrid fiber-coax cable television network having upstream data communication capabilities). While illustrated as embodied as a wireline based network, wireless arrangements are within the scope of the invention. The set top box 606 is also connected to the television 604 in order to provide video signals to television 604. A video headend 632 is provided by a video service provider and comprises a video sourcing system 616 connected to network 612, allowing video sourcing system to transmit video programming over network 612, downstream to subscriber premises 634.

Although the preferred embodiment described above with respect to the user premises uses a set top box, television and remote control, it is possible to utilize equivalent systems in alternate embodiments. For example, other equipment may be substituted for a set top box, such as a digital video recorder or a "media center" computer with the capability of receiving video programming. Likewise other display devices may be substituted for television 604 having the capability to receive video signals containing video programming and display such video programming. Remote controls may encompass various devices capable of transmitting control signals (such as polling requests and responses) to the set top box device in a wired or wireless manner.

Additionally, although the preferred embodiment described above with respect to the network 612 and video headend 632 comprises a two-way hybrid fiber-coax cable television network and associated headend facilities, it is possible to utilize equivalent systems in alternate embodiments. For example, network 612 may be any network that is capable of transmitting video programming to downstream subscribers and receiving upstream communications from such subscribers, and can embody both wireline and wireless carrier media (some examples being a fiber to the premises (FTTP) network, a fiber to the node (FTTN) network, an IPTV enabled network, and a wireless broadband network configured to accommodate video transmissions). Video headend 632 may include hardware and software appropriate for providing video transmissions of various types (live, analog, digital, encrypted, scrambled, on-demand, pay-per-view, etc.) and may encompass one or more physical devices, such as servers, storage systems, video processors, receivers, modems, and so forth.

In one embodiment, the set top box recognizes two types of 'channels' from the video provider, namely a data channel 618 and a video channel 614. The video channel can be based on a variety of technologies, including those used to convey digital video, such as a quadrature amplitude modulated (QAM) transmission channel. Other forms of video transmission can be used, such as video over IP or various forms of wireless transmission. Similarly, reference herein to a "data channel" should not be construed as being limited to any particular form of connection-based or connectionless communication, but rather, this should be broadly construed to be any of the well known forms of communication involving packet switched network addresses or communication using a packet switched network (including an IP-based network such as the Internet) that allow for communications to be directed to and received from an individual subscriber over the network. In general, any technology providing for bi-directional transfer can be adapted.

Although FIG. 6 illustrates the cable headend 632 and a single subscriber 634, typically there are numerous subscribers as network operators typically use a broadcast media for distribution of programming information. Thus, although the video channel is illustrated as a point-to-point configuration, in one embodiment, it is actually a broadcast channel in a point-to-multipoint configuration. The data channel, however, can be viewed as a point-to-point configuration. The other subscribers are not shown for reasons of clarity.

The data channel 618 provides a separate channel for bi-directional communication between the set top box and the video network provider. Specifically, the data channel in this embodiment communicates with a polling computer 620 that, in this embodiment, also includes a web (HTTP) server, which is able to provide the polling window data to the set top box via transmitting the appropriate HTML messages. Other embodiments may use other formatted messages or protocols, including XML, Java, or proprietary protocols between the headend and set top box. In this embodiment, the polling window is overlayed on the video images as a static window (e.g., its location does not change on the television screen) on the video image when presenting the video signal to the television. Such techniques for overlaying display windows are well known in the art.

The video channel 614 carries video information which is transmitted from video source system 616. Although the video channel is illustrated as a single channel, typically there are many video channels available on a video network. Typically, additional equipment is required to multiplex and otherwise process a variety of video channels onto the network. FIG. 6 illustrates only a single video source system, which is sufficient to illustrate the principles of the present invention. In the preferred embodiment, the video channels are digital in nature, although the principles of the present invention can apply to other forms.

The polling computer 620 has access to a programming computer 624 that stores program data, typically in the form of a program schedule. The programming computer 624 contains information regarding what television programs are currently being provided by the video source 616 on which channel and at what times. (Hence, the word "program" in "programming computer" refers to television programs, not a software application program.) It is presumed that infrastructure is in place (not shown) for automatically updating the programming computer 624 with the appropriate information regarding programs, times, and channels. Thus, the polling computer can query (or otherwise obtain or access) programming information about which specific programs are being provided on the cable network. This includes which programs are currently available on which channels. In this manner, the polling computer is able to ensure that the polling data presented is coordinated with currently presented programs (assuming the polling data pertains to a currently presented program)

Finally, the polling computer 620 is also connected to another computer, an analysis computer 628, that stores and processes feedback data from viewers. Because thousands of subscribers may be on video-enabled network 612, and multiple video service providers may be tied into a common polling computer, a separate analysis processor stores the polling data and analyzes the results. In other embodiments, the functions of the polling computer and analysis computer may be integrated. The analyzed results may be provided (or made accessible) in real time, for example, to the producers of the television program (not shown). Thus, for determining in real time the winner of a performance contest, the producers could analyze the feedback data from the analysis processor. Alternatively, the producers of the program could incorporate the analysis data into a feedback status graphic that is integrated into the video feed so that all viewers of the program would see the results. One such embodiment could be the aforementioned 'banner' appearing below the video image. For example, the program producers (e.g., originators of the program signals) could inject a signal representing a histogram chart indicating the relative percentage of how the viewers are voting for a particular contestant, or could run a continuous banner below the video image indicating the current vote status. Alternatively, the computer system 628 could provide the analyzed polling data back to the polling computer 620, which transmits the data to the set top box and the set top box overlays it onto the video data on the television screen.

Although FIG. 6 illustrates the polling computer, programming computer, and analysis computer as separate systems, in other embodiments these logical processing capabilities could be implemented on a single processing platform or on multiple processing platforms in a distributed architecture. Thus, whether the functions are implemented on a single processing platform or several, they are still within the scope of the present invention.

The typical flow for processing a polling request is now described in the context of FIG. 6. A user has selected a program to view, which requires the set top box 606 to process a particular channel request, typically indicated using a remote 600 thereby selecting a specific channel on the network 612. The particular channel is processed by the set top box 606 and displayed on the television 604 for viewing by the viewer. At some point the viewer invokes the polling service—e.g. they indicate a request for providing user feedback The user may be prompted to initiate this request based on the presence of an icon on the video image of the program (e.g., an icon that indicates real-time polling is possible), a verbal queue by a moderator during the program (e.g., "viewers can vote now for their favorite performer"), or based on the viewers own discretion. The user selects a "poll" function key (or some other keypad indication) on the remote controller 600 which sends a request for polling to the set top box 606. The set top box ascertains the current channel being viewed, and sends a message 610 to the polling computer over the data channel 618 indicating the poll request, an optional set top box identifier, and the current video channel being viewed by the viewer (e.g., selected by the set top box for presentation). The set top box identifier is typically an address, such as an IP address, that identifies the set top box or the data channel to the set top box, which can in turn be used to identify a subscriber (for example, by accessing tables or the video service provider's back office subscriber data stores which associates the set top box address with subscriber information). Thus, transmittal of the set top box identifier can be equated with a subscriber identifier. The set top box uses a data network address—in this example, an IP address—associated with the polling computer, which may be determined in part by the set top box by identifying the request from the user as a request for polling.

The transmittal of the set top box message 610 incorporates a destination address which terminates on the polling computer. The selection of the destination address can be determined in several ways. A single default address could be used for all such requests. Alternatively, a value can be selected from a table, wherein the choice of program currently being viewed may be used to determine the value from the table. In either case, the single default value or the table can be provided in various ways. They could be downloaded to the set top box upon powering up, periodically distributed via well known carouseling techniques, recorded in non-volatile memory by accessing a default site, etc. Regardless, the set top box selects the appropriate destination address to use when transmitting the request.

The polling computer 620 may access the program data in programming computer 624 to ascertain the appropriate program based on the channel identifier. (Alternatively, the data could be stored in the polling computer.) If the current program is, for example, a contest for selecting the most talented singer, then the server knows which is the appropriate polling window to present to the viewer. In other words, a polling window is typically associated with a given program, so that the appropriate program-specific questions are posed to the viewer. The polling computer provides a response 608 to the set top box (typically in transmitting HTML message or other similar protocols, such as Java, XML, etc.) indicating the appropriate polling window data. The set top box processes the polling data creating a polling window (e.g. a web page) which is overlayed on video program signal and displays it on the television screen (e.g., the polling window seen in FIG. 1).

The user can then use the remote controller 600 to navigate the options indicated on the polling window, provide the user's input, and submit their response.

In other embodiments, the network can download polling data for a variety of programs, and when the user initiates a polling request, the set top box scans its memory for the appropriate polling data and processes it to display the appropriate polling window on the display device.

Once the viewer has selected the desired options or voted accordingly, the set top box sends the polling data to the polling computer, which sends the data 626 to analysis computer 628 for storing and processing results from all the viewers. The destination address used may be a common destination address to a gateway, based on data provided in the polling window data response. If so, then further information must be analyzed to identify the particular poll that the data applies to. Alternatively, the destination address used by the set top box was specific for that polling request. This allows the polling computer to identify which application the response is to be associated with, based on the destination address used by the set top box.

The response data (which includes the viewer's selected views or vote) may be processed by the polling computer and made accessible to the television program source, so that real-time indications can be provided in the program with respect to current viewer feedback. In this embodiment, the feedback data is incorporated upstream, that is at the point the program signal is generated (most likely by the program producer). Alternatively, the result data may be incorporated into the system at other points in the distribution network by overlaying the polling window on the program signal.

Alternative embodiments are possible. For example, in FIG. 6, the polling window data was transmitted via the data channel to the set top box. The set top box then processes the data and generates the polling window locally. In other embodiments, the polling computer forms the polling window in a video signal and provides the information to the video source system 616 which distributes the information in video form as a separate video channel on the cable network. (This additional channel is not shown in FIG. 6). The user views the polling window by having the set top box select the polling channel and displaying the results to the user using picture-in-picture techniques. This allows the polling information to be processed as a separate video feed and displayed using the picture-in-picture capabilities in the television. It is possible that the resulting image displayed on the television is indistinguishable to the viewer.

For instances where the common interest groups are created, the polling computer in FIG. 6 may use the set top box identifier to identify a list of common interest groups previously created by the user. When sending the polling window to the members of the group, the group list would contain the appropriate network addresses of each of the users, and would typically use separate data channels to transmit the polling data to the set top box. In a similar setup, each of the other members of the interest group would have a set top box, a television, and ability to interact consistent with the architecture disclosed above.

The creation of polling windows for a common interest group (CIG) illustrates some of the functionality associated with creating polling windows. For example, polling windows for a television program which are intended to be presented to the entire viewing audience are typically defined by the television producer. However, polling windows for a common interest group (which are not typically presented to the entire viewing audience) are typically administered by a common interest group administrator. By their nature, a CIG polling window is presented to a narrower group of viewers. To illustrate the difference, consider a national sports broadcast program (e.g., a televised football game). The national broadcaster may opt to display polling windows, and will define the polling windows as desired. The polling window data can utilize the aforementioned techniques for overlaying data on video and can be distributed to the viewers. However, there may be a local football team fan club, which creates its own polling windows for a common interest group for the home team, which is only provided to viewers in a select market.

The CIG is typically provided with a mechanism for managing and creating the CIG polling window that is presented to the smaller market. Whereas the broadcaster displays the information to the national audience in an indiscriminate manner, the CIG provides its information locally, to a smaller subset.

There may be numerous CIGs and these can vary in size. Each common interest group typically designates an administrator that manages information associated with a CIG poll, such as who are the members in the group. In practice, there are several levels of administration defined. These are executed by a system administrator, a common interest group administrator, and potentially, even a member of the common interest group.

The administration levels can be viewed as a hierarchy, in that certain administration functions at a given level take precedence over those at another level or are required to exist prior to those occurring at a lower level. The system administrator is at the top of the hierarchy. The system administrator is typically closely associated with the cable service provider, and defines which, if any, CIGs are allowed to exist, how many members a CIG can have, which cable systems or serving areas are participating in a CIG polling service, and other implementation aspects. If a system administrator does not allow a CIG to create polling windows, then none can be created (effectively, there is no CIG). On the other hand, if a system administrator does allow a CIG to create polling windows for its members, then the CIG effectively exists, although there may not be any current instances of pending polling windows for a CIG. Typically, once a CIG exists, then a CIG administrator can then create a set of polling windows for the CIG and establishing an active poll.

Figure 7A:
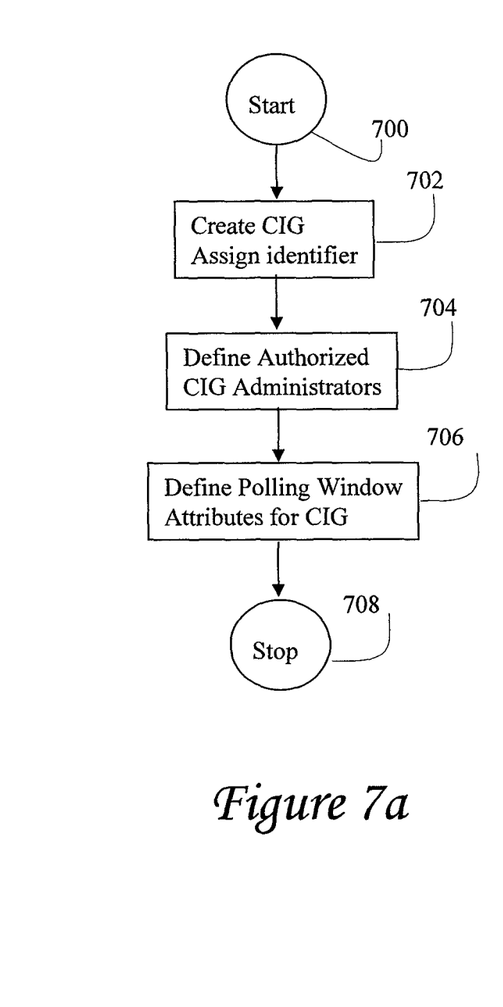
FIGS. 7a-7c illustrate one embodiment of common interest group related administrative functions.

FIG. 7 illustrates some of the functions that can be performed at each level. FIG. 7a illustrates some functions that may be associated with the system administrator. The steps shown are illustrative, and embodiments may augment or modify the functionality illustrated. In FIG. 7a, the system administrator may create a particular CIG 702 by assigning a CIG identifier, which identifies the CIG group. Typically, this information is stored in a database (not shown) that is operatively connected to the polling computer. The system administrator then authorizes certain CIG administrators 704 who can create and locally administer the CIG. Without such permission, either no individuals could create the specific CIG polling data, or anyone could do so, creating havoc. In addition, the system administrator also defines various limitations and attributes 706 associated with a CIG. Although not detailed, a system administrator may limit the size of a CIG, limit the number of polls that may occur in a particular CIG (serially, simultaneously, or otherwise), limit memory sizes associated with storing data associated with a CIG, limit geographical serving areas to which polling data may be sent, limit the times which polling may occur, limit which channels the polls may apply to, etc. In essence, any limitations desired by the cable operator that are desired to be enforced on a CIG are created by the system administrator.

Figure 7B:
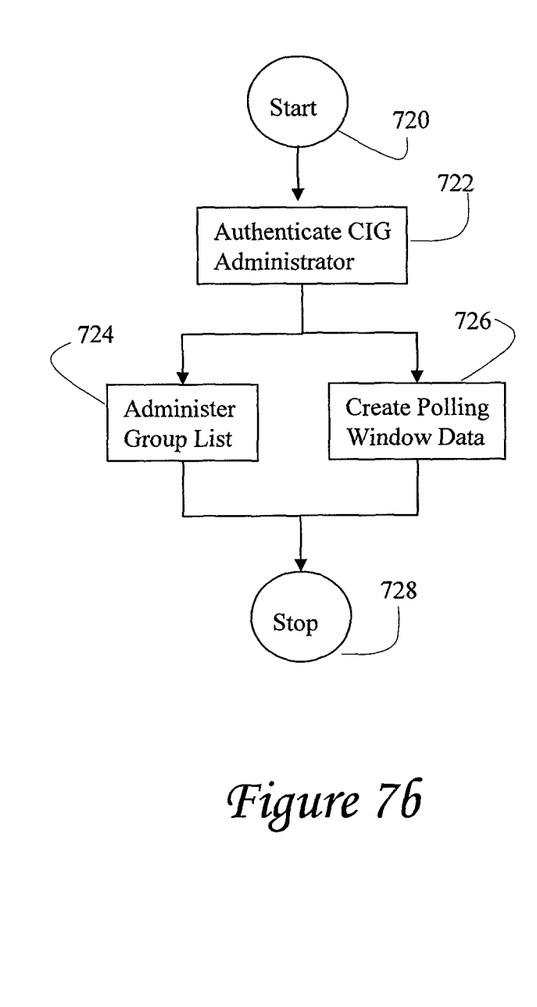

Once a CIG is authorized by the system administrator, the CIG administrator may perform various functions associated with the operation of a CIG, including creating instances of a poll. Typically, the system administrator does not make up the individual instances of an active poll for a CIG. The CIG functionality is shown in FIG. 7b, which illustrates one embodiment of functions which may be performed. Other embodiments may incorporate other functions. In FIG. 7b, the CIG administrator typically starts by identifying and authentication themselves 722. Typically, the functions performed by the CIG administrator can be summarized into two main functions. First, the CIG administrator will administer the group list 724. This entails creating the list of recipients to receive the polling window data, correcting errors in the list, updating the list by removing and/or adding members, etc. In some embodiments, prospective members may self-enroll into a CIG, via invitation or at will (e.g., registering at a web site or by invoking functionality in the set top box). While individual members may have authorization to edit their membership in a CIG, only the CIG administrator has authority to edit other member's including in a CIG membership list. Second, the CIG administrator will define the contents and attributes for a poll by creating the polling window data 726. Although shown as a single function, in practice there are various subfunctions associated with creating this data. This includes defining the layout of the poll, the members (e.g., the CIG group) the poll is associated with, what questions are provided in the poll, what are the allowable responses, etc. Also included is when the poll is to be initiated and how long member responses are collected, how responses are to be analyzed, how feedback is to be provided, etc.

Figure 7C:
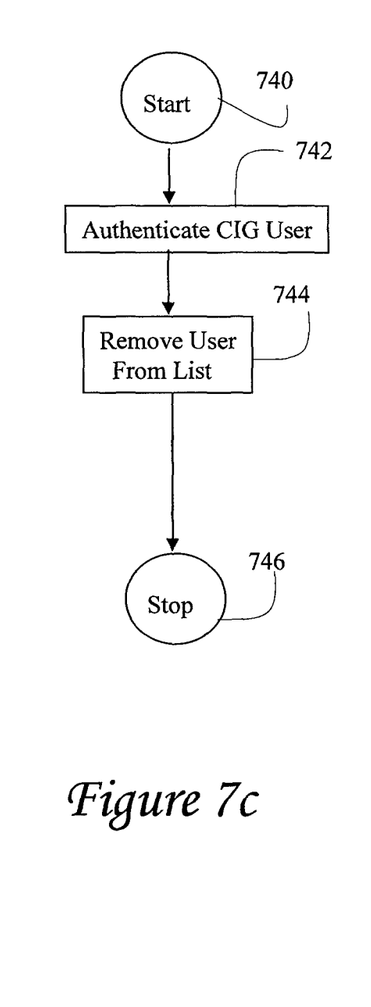

FIG. 7c also illustrates the lowest level of administration—that associated with a user or member of the CIG group. A member of a CIG may be allowed to perform limited administration functions. Typically, after a user has been identified and authenticated as being associated with a CIG 742, that user can then remove themselves from a CIG membership list 744, select certain options pertaining to their involvement, or otherwise limit or control their participation in polling events associated with a CIG. Once a member is a part of a CIG, that member may be able to administer certain aspects (e.g., such as removing themselves from the CIG) without having to request the CIG administrator perform each administrative function.

Typically, data associated with a CIG is stored on a database in the polling computer, and access for performing the administrative functions is accomplished using a web-based interface using readily available communication protocols. This approach facilitates remote access by each of the various levels of CIG management, and provides flexibility in defining what capabilities are associated with each level.

Regardless of whether the poll is associated with a CIG or not, the set top box may record the user's request for polling, and keep a history of the viewer's actions and responses. This information may be conveyed to the polling computer immediately, and/or retained in the set top box for future uploading to the polling computer. User polling activity may be a billable service for some video service providers, and the uploaded user history information may be used to properly bill the viewer for such services, if billing is desired. The usage information in the polling computer may be periodically 'pulled' or 'pushed' to another billing computer system generating periodic bills. Such billing may be usage based, tier based, or flat fee based.

The provision of polling may be a 'free service' provided by the cable network operator to enhance the user's viewing experience. In other embodiments, user interaction in a poll may be used to offset a user's bill. Thus, participation in surveys or other polls may result in a rebate or credit to the user's service bill, either directly or via third parties which receive the polling results data. For example, a select group of viewers may be polled with an incentive to participate by receiving direct payment, coupons, or a credit on their next cable bill. The cable network operator collects the results and provides them to a third party, which in turn compensates the cable network operator for conducting the poll. In other embodiments, the user may not be financially compensated, but knows that their feedback is highly determinative of the end results. For example, sophisticated movie reviewers may be offered an early free viewing of a movie on the condition that they provide their feedback to viewing the movie. This allows early and limited feedback to the program producer.

In other embodiments, surveys of prospective purchasers of products among the viewing audience may be conducted. For example, after viewing a commercial for a new product, select viewers may be asked to participate in a poll regarding the commercial or the product. Those participating may be provided a sample product for evaluation in exchange for their views. Since each response is from a known set top box, the system can map a response to a billing address for shipping the sample product, as well as correlating other demographic information with the survey result.

In another application, periodic surveys may be provided to viewers in which the contents of the survey is not dependent on the particular program being viewed, but rather the survey is provided to the viewers based on the demographics of the programs viewers. Thus, a young adults program may be used to present a survey to viewers for the purposes of obtaining the views of young adults on certain products or tastes, which may not be directly correlated to the contents of the program being viewed.

In order to accomplish such a survey, the cable system may match certain demographic information with subscriber information as identified by set top box identifiers. Thus, surveys targeted to higher level income areas can be matched to a group of set top box addresses, and those set top box addresses selected to receive polling data.

That which is claimed:
1. A method comprising:
receiving, at a set top box and from a remote controller operable viewer, a first indication of a polling request to provide viewer feedback associated with a video program currently being presented for viewing on a display device connected to the set top box;
determining, by the set top box, a channel identifier associated with the video program currently being presented for viewing on the display device;
determining, by the set top box, a packet switched network address associated with the request for providing viewer feedback;
transmitting, by the set top box, the channel identifier, a subscriber identifier and a second indication of the polling request, where the second indication of the polling request is different than the first indication of the polling request, over a packet switched network connected to the set top box using the packet switched network address;
receiving, at a polling computer connected to the packet switched network, the second indication of the polling request and the channel identifier where the polling computer determines a set of polling window data associated with a program identifier associated with the channel identifier, wherein the polling computer accesses a second computer system to identify the video program associated with the program identifier in order to select the set of polling window data from a plurality of polling window data;

transmitting, by the polling computer, the set of polling window data to the set top box;

displaying, for viewing on the display device, a polling window based on the set of polling window data;

receiving viewer feedback data at the set top box, the viewer feedback data including selection of one of the set of polling window data associated with the polling window;

transmitting, by the set top box, the viewer feedback data to the polling computer over the packet switched network; and providing, by a computer, a bill to the viewer based on the program identifier and the second indication of the polling request.

2. The method of claim 1, where the polling computer hosts a web site and the set of polling window data comprises HTML messages.

3. The method of claim 2, where the polling window is displayed on the display device as a static web page overlaid on a video program image.

4. The method of claim 1, where displaying a polling window includes:
providing a plurality of selections, related to the polling request, independently selectable by the viewer.

5. The method of claim 1, where the set of polling window data is associated with the subscriber identifier.

6. The method of claim 1, where the polling computer transmits the viewer feedback data to an analysis computer, where the analysis computer processes the viewer feedback data with feedback data from other viewers of the video program.

7. The method of claim 6, where the analysis computer provides a cumulative total of feedback data from the viewer and the other viewers.

8. The method of claim 7, where the cumulative total of feedback data is incorporated into a video program signal that is sent to the viewer and the other viewers.

9. The method of claim 1, where the polling computer accesses programming schedule data to ascertain a channel identifier associated with the program identifier.

10. The method of claim 1, further comprising:
recording the polling request using the set top box.

11. The method of claim 1, where receiving, at a polling computer connected to the packet switched network, the second indication of the polling request and the channel identifier further comprises:
identifying a specific polling request based on the packet switched network address used by the set top box.

12. A system comprising:
a set top box operatively connected to a video distribution network and a display device, where the set top box is to:
provide a video program, via a video signal, to the display device, receive, from a viewer, a first indication of a polling request for subsequently providing viewer input pertaining to the video program, and generate a request for polling window data in response to the polling request, where the request for polling window data is transmitted using a packet-switched data communication channel provided by the video distribution network, the request includes a channel identifier associated with the video program, a subscriber identifier and a second indication of the polling request, and the second indication of the polling request is different than the first indication of the polling request; and a polling computer system connected to the packet-switched data communication channel:
receive, from the set top box, the request for polling window data and the second indication of the polling request and the subscriber identifier,
use the channel identifier to identify a program identifier associated with the video program,
use the program identifier to select polling window data associated with the video program,
transmit the selected polling window data to the set top box,
receive viewer input pertaining to the video program transmitted from the set top box, and
generate billing data based on the program identifier and the second indication of the polling request, and
wherein the polling computer system accesses a second computer system to identify the video program associated with the program identifier in order to select the polling window data from a plurality of polling window data.

13. The system of claim 12 where the polling computer transmits the viewer input to a second computer, the second computer processing a plurality of inputs from other viewers, to generate a cumulative polling result associated with the video program.

14. The system of claim 12 further comprising;
a video source providing a plurality of video channels distributed on the video distribution network, where one of the plurality of video channels conveys the video program.

15. The system of claim 12 where the polling computer transmits the polling window data to the set top box using HTML messages.

16. The system of claim 15 where the set top box displays the polling window data as a static window overlaid on a video image of the video program.

17. The system of claim 12, where the set top box records the polling request.

18. The system of claim 12, where the polling system computer is further to:
identify a specific polling request based on the packet switched network address used by the set top box.

19. A method comprising:
identifying, based on a plurality of set top box identifiers associated with a plurality of set top boxes, a list of viewers associated with a common interest group previously created by one of the viewers;
receiving, at a polling computer, a polling request sent from one of the plurality of set top boxes over a video enabled network, the polling request being sent using an Internet Protocol channel;
identifying a video channel identifier in the polling request;
accessing a programming schedule to determine a program identifier presently associated with the channel identifier and a video program transmitted on the video channel, wherein accessing the programming schedule further comprises accessing, by the polling computer, a second computer that stores the programming schedule to determine the program identifier presently associated with the channel identifier;
selecting a web page, associated with the program identifier, based on the common interest group;
transmitting the web page, over the Internet Protocol channel, to the plurality of set top boxes for display on display devices connected to the plurality of set top boxes, where the web page pertains to the video program associated with the program identifier and provides a plurality of available selections for a viewer;

receiving, on the Internet Protocol channel, a response from each of the plurality of set top boxes, the response including response data corresponding to at least one of the plurality of available selections provided by the web page;

storing, at the polling computer, the response data from each of the plurality of set top boxes; and generate billing data based on the program identifier and the second indication of the polling request.

20. The method of claim 19, further comprising:

transmitting the response data to a third computer for storage.

* * * * *